United States Patent Office 2,908,646
Patented Oct. 13, 1959

2,908,646

LUBRICATING GREASES CONTAINING POLYMERIZED DIHYDROQUINOLINES

James R. Roach, Beacon, and John P. Dilworth, Fishkill, N.Y., assignors to Texaco Inc., a corporation of Delaware No Drawing. Application January 24, 1956
Serial No. 561,151

4 Claims. (Cl. 252—42.1)

This invention relates to improved lubricating greases containing compounds of a class of polymerized dihydroquinoline derivatives.

The polymerized dihydroquinoline derivatives which are employed in lubricating greases in accordance with this invention are polymers of lower alkyl derivatives of dihydroquinoline the monomers of which are represented by the following formula:

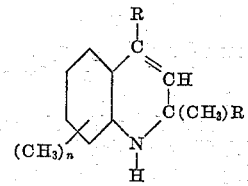

wherein R is a methyl or ethyl group and $n$ is 1 or 0. The polymer preferably contains from 2 to about 5 of the monomeric groups. It is usually in the form of a mixture of polymers in the range from dimers through pentamers with small amounts of higher polymers.

The above polymers are a class of commercially available resinous materials, insoluble in lubricating oils at ordinary temperatures, which are employed in rubber and in certain artificial resins to impart improved resistance to age hardening and thermoplasticity. We have found that the incorporation of small amounts of these materials into lubricating greases improves and stabilizes the gel structure of the greases. Important advantages, including increased yields and improved texture and other properties are therefore obtained by the use of these materials in greases. A special advantage obtained is the very exceptional improvement in high temperature performance properties which they impart to soap thickened greases.

The monomers of these compounds are obtained by the well known quinoline synthesis from aromatic primary amines and carbonyl compounds, employing aniline or a toluidine as the amine, and acetone or methyl ethyl ketone as the carbonyl compound. The reaction of aniline and acetone yields 2,2,4-trimethyl-1,2-dihydroquinoline. The reaction of aniline and methyl ethyl ketone yields 2-methyl-2,4-diethyl-1,2-dihydroquinoline. The reaction of ortho, meta and para toluidines with acetone yields, respectively, 2,2,4,8-tetramethyl-1,2-dihydroquinoline, 2,2,4,7 - tetramethyl - 1,2 - dihydroquinoline, and 2,2,4,6-tetramethyl-1,2-dihydroquinoline. The reaction of ortho, meta and para toluidines with methyl ethyl ketone yields, respectively, 2,8-dimethyl-2,4-diethyl-1,2-dihydroquinoline, 2,7 - dimethyl - 2,4 - diethyl - 1,2-dihydroquinoline and 2,6 - dimethyl - 2,4 - diethyl - 1,2 - dihydroquinoline.

The polymerization is carried out by heating monomers of the above class at moderately elevated temperatures in the presence of a dilute acid. A commercial method whereby suitable polymers are obtained comprises heating the monomer at a temperature of about 110-150° C. in the presence of aqueous hydrochloric acid for at least about 16 hours.

In accordance with this invention, polymerized dihydroquinoline derivatives of the above class are employed in lubricating greases in amounts from about 0.1 to about 10 percent by weight. They are preferably employed in amounts of about 0.5-5 percent by weight. In addition, minor amounts of other additives of the usual types such as oxidation inhibitors, corrosion inhibitors, extreme pressure agents and so forth may be employed. Oxidation inhibitors of the amine type, such as diphenylamine, para-phenylene diamine and various aliphatic amines are particularly suitable for use in these greases.

As a preferred embodiment of this invention, improved high temperature performance properties are imparted to ball and roller bearing greases thickened with about 5-25 percent by weight, and most suitably about 10-25 percent by weight of sodium myristate by the addition of small amounts of polymerized dihydroquinoline derivatives of the class described above.

The oleaginous liquids employed in these greases may be any suitable oils of lubricating characteristics, including the conventional mineral lubricating oils, synthetic oils obtained by various refining processes such as cracking and polymerization and other synthetic oleaginous compounds such as high molecular weight ethers and esters. The dicarboxylic acid esters such as di-2-ethylhexyl sebacate, di(secondary amyl) sebacate, di-2-ethylhexyl azelate, etc. and condensation products of dicarboxylic acids with glycols as disclosed in U.S. 2,628,974, are a particularly suitable class of synthetic oils, and may be employed as the sole oleaginous component of the grease or in combination with other synthetic oils or mineral oils. Other types of synthetic oleaginous materials which may be employed in these greases include the silicone polymer oils, including dialkyl silicone polymers such as dimethyl silicone, diethyl silicone etc., and mixed arylalkyl silicone polymers such as phenylmethyl silicone polymers, having viscosities in the lubricating range. Suitable mineral oils are those having a viscosity in the range from about 100 to about 2000 seconds Saybolt Universal at 100° F., and may be either naphthenic or paraffinic in type, or blends of the two.

The greases may be prepared by conventional methods, either by merely mixing together the thickening agent and oleaginous liquid at a suitable temperature, or by saponification in situ. The polymerized dihydroquinoline derivative may be added at any stage in the grease making process when the temperature of the grease mixture is above the melting point of the polymer or when the mixture is thereafter heated to such a temperature. The polymer may be added directly to the grease mixture or it may be added in the form of a solution in a portion of the lubricating oil employed in the grease. In preparing certain soap thickened greases which are difficult to prepare in satisfactorily smooth form, such as greases thickened with calcium soaps of hydroxy fatty acids, the polymer is preferably added to the charge before saponification. Instead of incorporating the stabilizing agent during the grease making process, it may be worked into the finished grease while the grease is maintained at a temperature above the melting point of the polymer.

The following example is given for the purpose of further disclosing the invention.

Example

A grease was prepared in accordance with this invention containing sodium myristate as the thickening agent in a mineral lubricating oil base. The saponifiable material employed was a commercial myristic acid having a saponification number of 243, a neutralization number of 244 and a titer of 49.2° C. The mineral lubricating oil was a blend of a refined paraffin base residual oil having a Saybolt Universal viscosity at 210° F. of 120 seconds and a paraffin base distillate oil of SAE20 grade in a 5.5:1 proportion by weight. The polymerized 2,2,4-trimethyl-1,2-dihydroquinoline was a commercial product obtained from B. F. Goodrich Co., consisting chiefly of the trimer.

The grease was prepared by saponification of the myristic acid with a slight excess of a sodium hydroxide solution in the presence of a small amount of mineral lubricating oil and water at about 170–190° F., dehydrating the mixture at 295–320° F. for about 2½ hours and adding the remainder of the mineral lubricating oil during the cooling. The polymerized 2,2,4-dihydroquinoline was added during the oil addition while the temperature of the mixture was about 240° F.

The composition and tests upon the grease obtained are shown below.

Composition:
- Sodium myristate, percent _____ 15.5
- Trimethyldihydroquinoline polymer, percent __ 3.0
- Lubricating oil _____ Remainder Inspection tests:
- Dropping point _____ °F__ 400
- Free fatty acid, percent_____ 0.04
- NaOH, percent _____ 0.13

Low temperature torque test:

| 20,000 gm. cm.: Sec./Rev. at— | c.w. | c.c.w. |
|---|---|---|
| 0° F. | 5 | 8 |
| −10° F. | 27 | 13 |
| −20° F. | >120 | >120 |

High temperature performance test: Hours to failure 300° F_____ 1492

The high temperature performance test of the above table is a test for determining the stability of greases to resist oxidation and thermal breakdown under conditions of high rates of shear at elevated temperatures. This test is described in U.S. 2,663,691, col. 3, line 58, col. 4, line 29.

As shown by the above table, the sodium myristate grease containing a small amount of a polymerized dihydroquinoline derivative of the class of compounds which are employed in lubricating greases in accordance with this invention, was highly resistant to oxidation and thermal breakdown at moderately elevated temperatures, running well over the 600 hours at 300° F. required by military specification MIL–L–3545 for a grease of this type. In addition the grease had a satisfactorily low torque at temperatures down to about −20° F., being substantially equivalent in this respect to a grease of the same composition without the polymer.

Obviously, many modifications and variations of the invention, as hereinbefore set forth may be made without departing from the spirit and scope thereof and therefore only such limitations shall be imposed as are indicated in the appended claims.

We claim:

1. A lubricating grease consisting essentially of a mineral lubricating oil containing sodium myristate in grease forming proportions and about 0.1–10 percent by weight of polymer the monomer of which has the formula

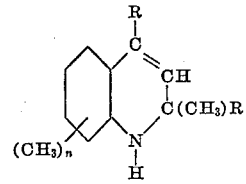

wherein R is chosen from the group consisting of methyl and ethyl groups and $n$ is chosen from the group consisting of 1 and 0.

2. Claim 1 wherein the said polymer is polymerized 2,2,4-trimethyl-1,2-dihydroquinoline.

3. A lubricating grease consisting essentially of a mineral lubricating oil containing about 5–25 percent by weight based on the weight of the composition of sodium myristate and about 0.5–5 percent by weight of polymerized 2,2,4-trimethyl-1,2-dihydroquinoline.

4. A lubricating grease consisting essentially of a mineral lubricating oil containing about 10–25 percent by weight based on the weight of the composition of sodium myristate and about 1–5 percent by weight of polymerized 2,2,4-trimethyl-1,2-dihydroquinoline.

References Cited in the file of this patent

UNITED STATES PATENTS 2,585,182     Sterman _____ Feb. 12, 1952